Patented Sept. 1, 1931

1,820,962

UNITED STATES PATENT OFFICE

ALBERT L. CLAPP, OF DANVERS, MASSACHUSETTS

PAPER MANUFACTURE

No Drawing.  Application filed September 26, 1928. Serial No. 308,581.

This invention relates to the manufacture of paper, paperboard, and the like, and has to do more particularly with the manufacture of papers similar to those made of highly gelatinized pulp, for instance those of the so-called glassine variety.

It is well known that when cellulose pulp is beaten, it undergoes what is generally known as hydration or gelatinization, the pulp fibers becoming coated with gelatinized cellulose and changing from a "free" to a "slow" condition. When pulp is beaten hard over a long period of time, say, sixteen hours or longer, it becomes so highly gelatinized that it yields translucent papers (the so-called glassine papers) and hard, dense paperboards having a decided gloss.

I have discovered that it is possible to dispense with a long beating period in the production of papers or paperboards similar to those composed of highly gelatinized cellulose fiber, if a water-swollen, water-soluble gel is incorporated into the pulp and the resulting paper or paperboard is subjected while still in damp condition to heavy pressures, as by calendering or supercalendering. Various gels of the character described may be employed for this purpose, a water-swollen, water-insoluble glue being especially suitable, as it imparts high strength and greaseproof properties to the paper. It is necessary that the gel contain a high proportion of water but at the same time be water-insoluble, in order to obtain the results desired. For instance, if glue were added in water-soluble condition to cellulose pulp in the beater engine, the results hereinbefore described would not be obtained, even if the glue were precipitated on the fibers with precipitants such as alum, as comparatively little glue would be precipitated, and that precipitated would contain little water, as compared with the gel. It is also necessary that the paper be still damp when subjected to heavy pressure, for when the paper is dewatered to a bone-dry condition, the gel becomes dehydrated and behaves as an ordinary filling material in the sheet. With the paper in damp condition, the gel is apparently maintained as gel, and when the paper is subjected to heavy pressure, as by calendering, it acquires characteristics similar to paper made of highly gelatinized pulp. Apparently, the gel becomes uniformly distributed throughout the fibers of the paper, fills its pores and interstices, and becomes set in a condition similar to the gelatinized cellulose of a highly gelatinized pulp. Various gels suitable for the use described may be prepared from different raw materials and by different methods of procedure. For instance, a water-swollen, water-insoluble glue gel may be prepared by dissolving or swelling 10 parts of dry glue in 100 parts of water, then converting into a water-insoluble condition by adding a condensing or tanning agent such as formaldehyde, 10 parts being sufficient to produce the desired result. Preferably, 1 to 2 parts of acetic acid is also added to hasten the reaction. At the end of about ten to twelve hours, a stiff gel of the desired character is obtained. A similar gel may be prepared from urea by dissolving 1 part in about 50 parts of water, and then condensing the urea by the addition of, say, 3 parts of formaldehyde and ½-part of acetic acid. Similar gels may be formed from silicate of soda by the addition of various reagents. Thus, 40 parts of 15° Baumé silicate of soda, when treated with a weak acid, say, about 10 parts of 5% acetic acid or with a weak base, say, 2 parts of lime suspended in 5 parts of water, is converted into a gelatinous mass of the desired character. Apparently, what takes place is the formation of a silicic acid gel, so that a dilute acid as base must be used to avoid precipitation of the silica from the silicic acid and the decomposition of the gel.

Casein may be employed as the raw material for a suitable gel, by dissolving it in a suitable alkali such as borax, and then adding a suitable condensing agent such as acetic acid. Cellulose xanthate may also be converted into a suitable gel by allowing it to decompose spontaneously, or else hastening decomposition by the addition of chemicals such as acetic acid, formaldehyde, or the like.

The gels described may be used in the manufacture of paper or paperboard of the desired character, substantially as follows. One hundred parts of any suitable pulp, preferably one which gives paper of sufficient strength to withstand calendering in damp condition, such as sulphite, rag, or kraft stock, is charged in a beater engine, sufficient water being added to ensure free circulation of the stock, and the engine set in operation. After the stock has been disintegrated, a mass of gel such as described is added, say, 25% to 50% by weight, based on the weight of dry fiber. The gel is uniformly disseminated throughout the fiber by the operation of the engine, the fiber preferably being beaten quite hard for about three to four hours, as this ensures a paper of uniform texture and of sufficient strength to undergo calendering in damp condition. Suitable sizing materials, such as rosin size, may be added to the fiber, and the size precipitated on the fibers with alum when a water-resistant paper is desired. As the stock is being beaten, the gel is comminuted into fine particles, which cling to and coat the fibers so that when the stock is handled, it feels much like very slow stock which has been highly beaten. The beaten stock may be diluted to papermaking consistency and run off on a paper machine, but the paper should not be de-watered to bone-dryness, about 15% to 20% of water being left in the paper after drying, whereupon it may be run through calenders or super-calenders. The calendered paper has the appearance of being composed of highly gelatinized fiber, being translucent in the case of comparatively thin papers and being hard, dense, and having a decided gloss in the case of paper-boards. When a glue gel is employed in the treatment of the fiber, the calendered paper is greaseproof and has greater strength than the usual glassine papers.

It has been stated that it is necessary to calender the paper while in damp condition. This is an essential feature of the process of the present invention, for when a bone-dry paper is calendered, it is found that the results desired are not obtained, the gel having been dried out to produce a filler in the paper. When the paper is dried out, brought back to damp condition, and then calendered, best results are not obtained, doubtless owing to the fact that the filler does not readily absorb water and go back to gel form.

Having thus described certain embodiments of this invention, it should be evident to those skilled in the art that various changes and modifications might be made therein without departing from the spirit and scope of invention as defined by the appended claims.

I claim:

1. A process which comprises incorporating a water-swollen but water-insoluble gel into paper pulp, sheeting the mixture, and subjecting the sheet to high pressure with the gel in a highly hydrated condition.

2. A process which comprises incorporating a water-swollen but water-insoluble glue gel into paper pulp, beating the mixture, sheeting the mixture, dewatering the sheet to a moisture content of about 15% to 20%, and calendering the damp sheet.

3. A process which comprises incorporating a water-swollen but water-insoluble gel into cellulose pulp, beating the mixture, sheeting the mixture, dewatering the sheet to a damp condition, and subjecting the paper to high pressure in such condition.

4. A process which comprises incorporating a water-swollen but water-insoluble gel into cellulose pulp, adding size, precipitating the size on the pulp fibers, sheeting the mixture, and subjecting the sheet to high pressure with the gel in a highly hydrated condition.

5. A damp-calendered paper containing a water-swollen but water-insoluble gel in set condition distributed therethrough and filling the pores and interstices thereof.

6. A damp-calendered paper containing a water-swollen but water-insoluble glue gel in set condition distributed therethrough and filling the pores and interstices thereof.

7. A sized, damp-calendered paper containing a water-swollen but water-insoluble gel in set condition distributed therethrough and filling the pores and interstices thereof.

In testimony whereof I have affixed my signature.

ALBERT L. CLAPP.